(12) United States Patent
Fournier (10) Patent No.: US 9,167,671 B2
(45) Date of Patent: Oct. 20, 2015

(54) FLICKERING ILLUMINATION CONTROL TECHNIQUES (71) Applicant: Nii Northern International Inc., Coquitlam (CA)

(72) Inventor: Bernard Fournier, Delsen (CA)

(73) Assignee: NII Northern International Inc., Coquitlam, British Columbia (CA)

( * ) Notice: Subject to any disclaimer, the term of this patent is extended or adjusted under 35 U.S.C. 154(b) by 365 days.

(21) Appl. No.: 13/874,089

(22) Filed: Apr. 30, 2013

(65) Prior Publication Data

US 2013/0285554 A1   Oct. 31, 2013

Related U.S. Application Data (60) Provisional application No. 61/640,488, filed on Apr. 30, 2012.

(51) Int. Cl.
*H05B 37/00* (2006.01)
*H05B 37/02* (2006.01)

(52) U.S. Cl.
CPC ............. *H05B 37/0281* (2013.01); *Y02B 20/42* (2013.01)

(58) Field of Classification Search
CPC ................................. H05B 37/0281
USPC ........................................ 315/127
See application file for complete search history.

(56) References Cited

U.S. PATENT DOCUMENTS

| 5,091,678 A | 2/1992 | Chin-Song |
| 7,038,399 B2 | 5/2006 | Lys et al. |
| 7,164,238 B2 | 1/2007 | Kazanov et al. |
| 2012/0013265 A1* | 1/2012 | Yang et al. ............ 315/246 |
| 2012/0081015 A1 | 4/2012 | Shimomura et al. |
| 2012/0098439 A1 | 4/2012 | Recker et al. |

OTHER PUBLICATIONS

PCT, Notification of Transmittal of the International Search Report and the Written Opinion of the International Searching Authority, or the Declaration, in International application No. PCT/CA2013/000424, dated Aug. 5, 2013. (8 pages).
PCT, Notification Concerning Transmittal of International Preliminary Report on Patentability, in Application No. PCT/CA2013/000424, dated Nov. 13, 2014 (5 pages).
SimFlame—Simulated Flame Incandescent Lamp Controller, http://www.simflame.com/web.archieve.org/web/20100925063714, retrieved from the Internet on May 1, 2013 (7 pages).

* cited by examiner

*Primary Examiner* — Daniel Puentes
(74) *Attorney, Agent, or Firm* — McAndrews, Held & Malloy, Ltd.

(57) ABSTRACT

According to certain inventive techniques, a method for operating a flickering illumination control device including an electrical input and an electrical output includes receiving an input voltage at the electrical input. A non-flickering output voltage may be provided at the electrical output. While receiving the input voltage and while providing the non-flickering output voltage, a first interruption in current flowing through the electrical output may be detected. In response to the first interruption, a flickering output voltage is provided at the electrical output.

17 Claims, 11 Drawing Sheets

FLICKERING ILLUMINATION CONTROL TECHNIQUES

BACKGROUND OF THE APPLICATION

Generally, this application relates to techniques for controlling flickering illumination, for example, in a free-standing light fixture.

BRIEF SUMMARY OF THE APPLICATION

According to certain inventive techniques, a method for operating a flickering illumination control device including an electrical input and an electrical output includes receiving an input voltage at the electrical input. A non-flickering output voltage may be provided at the electrical output. The non-flickering output voltage may be the same as the input voltage. While receiving the input voltage and while providing the non-flickering output voltage, a first interruption in current flowing through the electrical output may be detected. In response to the first interruption, a flickering output voltage may be provided at the electrical output.

While receiving the input voltage and while providing the flickering output voltage, a second interruption in current flowing through the electrical output may be detected. In response to the second interruption, the non-flickering output voltage may be provided at the electrical output.

The state of an override switch on the flickering illumination control device may be detected to determine whether the override switch is in an override state. If the override switch is in the override state, the non-flickering output voltage may be provided instead of the flickering output voltage at the electrical output.

According to certain inventive techniques, a method for operating a flickering illumination control device including an electrical input and an electrical output includes receiving an input voltage at the electrical input. While receiving the input voltage, an interruption in current flowing through the electrical output may be detected. A duration of the interruption may be measured. According to the length of the duration of the interruption, either a flickering output voltage or a non-flickering output voltage may be alternatively provided to the electrical output. The non-flickering output voltage may be the same as the input voltage.

It may be determined whether the length of the duration of the interruption is greater than a reference length of time or lesser than the reference length of time. If the length of the duration of the interruption is greater than the reference length of time, the non-flickering output voltage may be provided to the electrical output. If the length of the duration of the interruption is lesser than the reference length of time, the flickering output voltage may be provided to the electrical output.

It may be detected whether an override switch on the flickering illumination control device is in an override state. If the override switch is in the override state, the non-flickering output voltage may be provided instead of the flickering output voltage at the electrical output.

According to certain inventive techniques, a method for operating a flickering illumination control device including an electrical input and an electrical output includes receiving, at a first time, an input voltage at an electrical input and responsively providing a non-flickering voltage to the electrical output. The non-flickering output voltage may be the same as the input voltage. At a time between subsequent to the first time, a first interruption of the input voltage may be received at the electrical input. At a second time subsequent to the first interruption, the input voltage at the electrical input may be received and a flickering voltage may be responsively provided to the electrical output.

At a time subsequent to the second time, a second interruption of the input voltage may be received at the electrical input. At a third time subsequent to the second interruption, the input voltage at the electrical input may be received and a non-flickering voltage may be responsively provided to the electrical output.

It may be detected whether an override switch on the flickering illumination control device is in an override state. If the override switch is in the override state, the non-flickering output voltage may be provided instead of the flickering output voltage at the electrical output.

According to certain inventive techniques, a method for operating a flickering illumination control device including an electrical input and an electrical output includes receiving an input voltage at the electrical input. An interruption in the input voltage may be detected. A length of the duration of the interruption may be measured. According to the length of the duration of the interruption, either a flickering output voltage or a non-flickering output voltage may be alternatively provided to the electrical output. The non-flickering output voltage may be the same as the input voltage.

It may be determined whether the length of the duration of the interruption is greater than a reference length of time or lesser than the reference length of time. If the length of the duration of the interruption is greater than the reference length of time, the non-flickering output voltage may be provided to the electrical output. If the length of the duration of the interruption is lesser than the reference length of time, the flickering output voltage may be provided to the electrical output.

It may be detected whether an override switch on the flickering illumination control device is in an override state. If the override switch is in the override state, the non-flickering output voltage may be provided instead of the flickering output voltage at the electrical output.

According to certain inventive techniques, a device includes an electrical input configured to receive an input voltage. The device may also include an electrical output and output conditioning circuitry electrically connected to the electrical input and the electrical output. The output conditioning circuitry may be configured to: receive the input voltage from the electrical input; and while receiving the input voltage, alternately provide a flickering alternating current output voltage or a non-flickering alternating current output voltage to the electrical output in response to interruptions in the current flowing through the electrical output.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION OF THE APPLICATION

Figure 1:
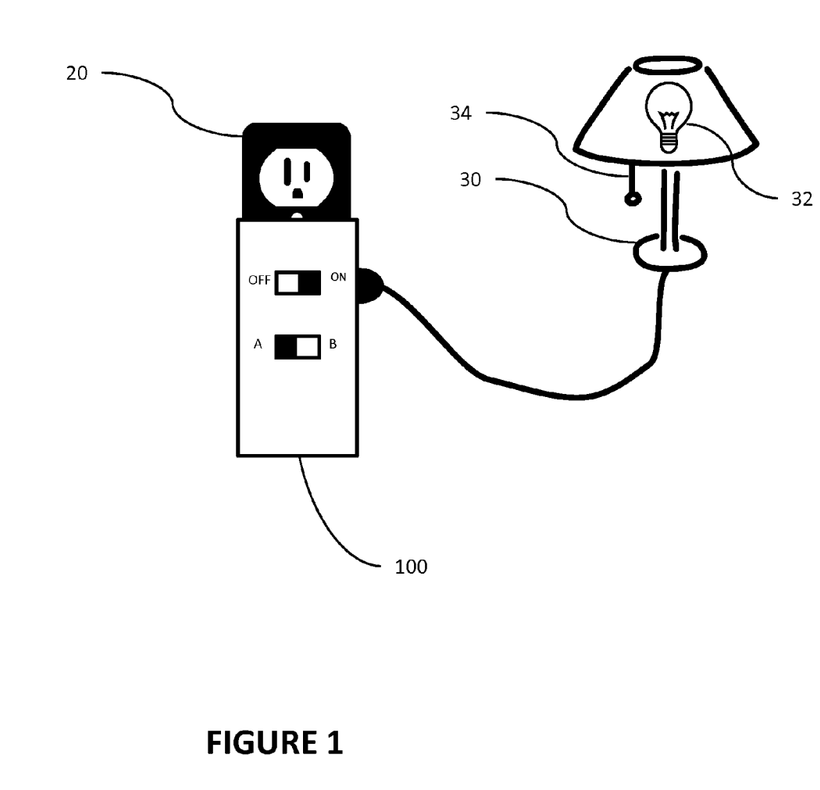
FIG. 1 illustrates a system including a flickering illumination control device, according to techniques of the present application.

FIG. 1 illustrates a system including a flickering illumination control device 100, according to techniques of the present application. The device 100 may be plugged into an outlet 20. A lamp or other light source 30 may be plugged into the device 100. The light fixture 30 (for example, a fixed or free-standing fixture) may include a switch 34 to switch on/off a light source (for example, an incandescent, fluorescent, or light-emitting diode source). The device 100 may provide a varying voltage to the light source 30 that is intended to cause a flickering effect, similar to that of a flame (for example, a candle flame). The device 100 may also provide a substantially constant voltage to the light source 30 that is intended to cause the light source 30 to illuminate in a non-flickering manner.

If the voltage provided to the light source 30 is an AC voltage, it should be understood that a varying or flickering voltage has a varying root mean square ("RMS") value and the non-flickering voltage has a substantially constant RMS value.

Figure 2:
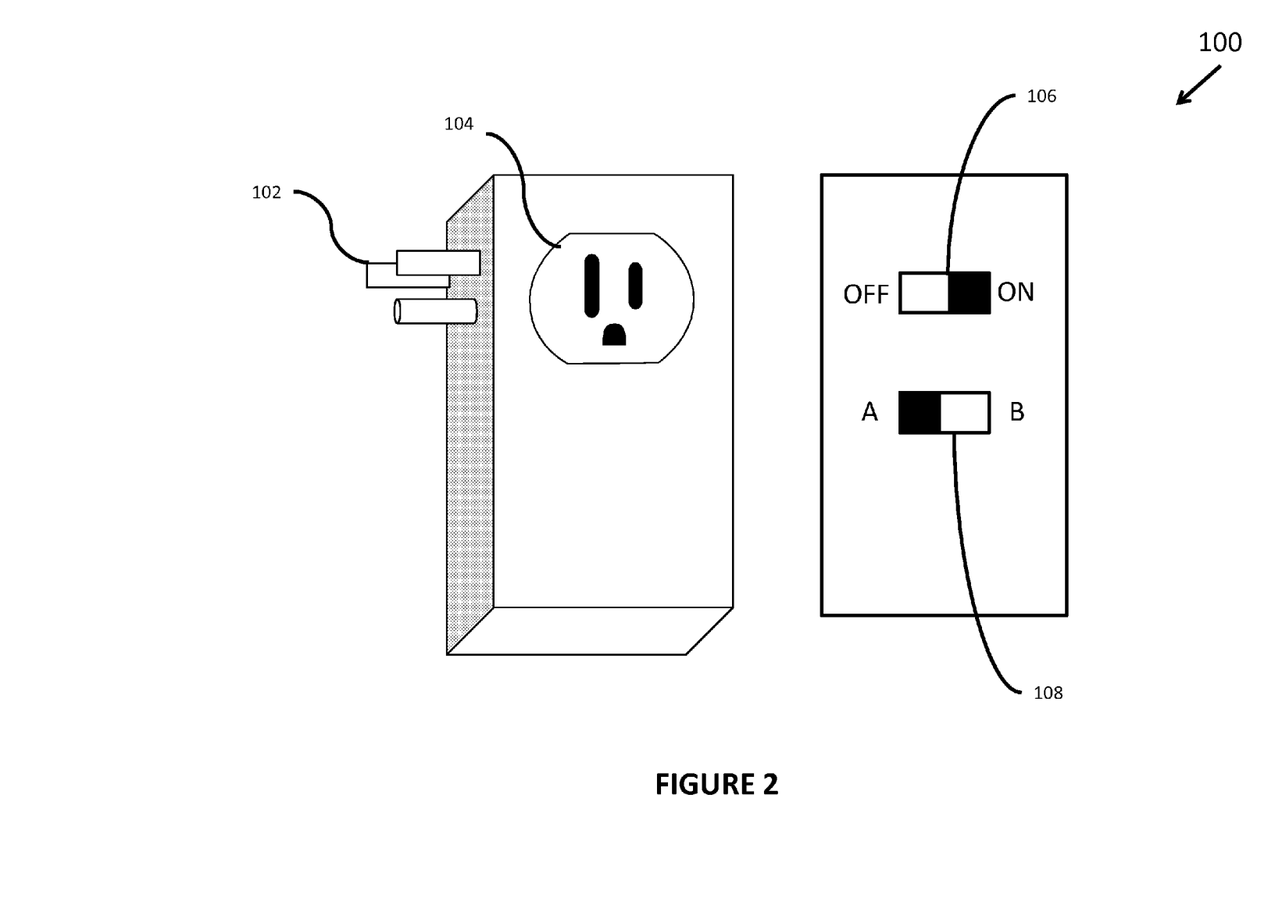
FIG. 2 illustrates a flickering illumination control device, according to techniques of the present application.

Turning to FIG. 2, the device 100 may include an electrical input 102 and an electrical output 104. It may be possible to have more than one electrical output 104 on the device 100. The electrical input 102 may include a plug (for example, a plug designed and rated for 115 VAC) and may be configured to mate with a compatible outlet (for example, an electrical outlet on a wall). The electrical output 104 may include a socket or electrical outlet. The device 100 may include one or more switches, such as an override switch 106 or a mode switch 108. The override switch 106 may disable the device from providing flickering illumination control, so that the light source 30 is only provided with a non-flickering voltage. The mode switch 108 may adjust the type of flickering voltage provided by the device 100. For example, the mode switch 108 may adjust the intensity or frequency of the flickering voltage. As another example, the mode switch 108 may change the functionality of the override switch 106. For example, if the mode switch 108 is in position A and the override switch 106 is ON, then the device 100 may always provide a non-flickering voltage to the light source 30. As another example, if the mode switch 108 is in position B and the override switch 106 is ON, then the device 100 may always provide a flickering voltage to the light source 30. The device 100 may also include a timer or other lighting control functionality.

Figure 3A:
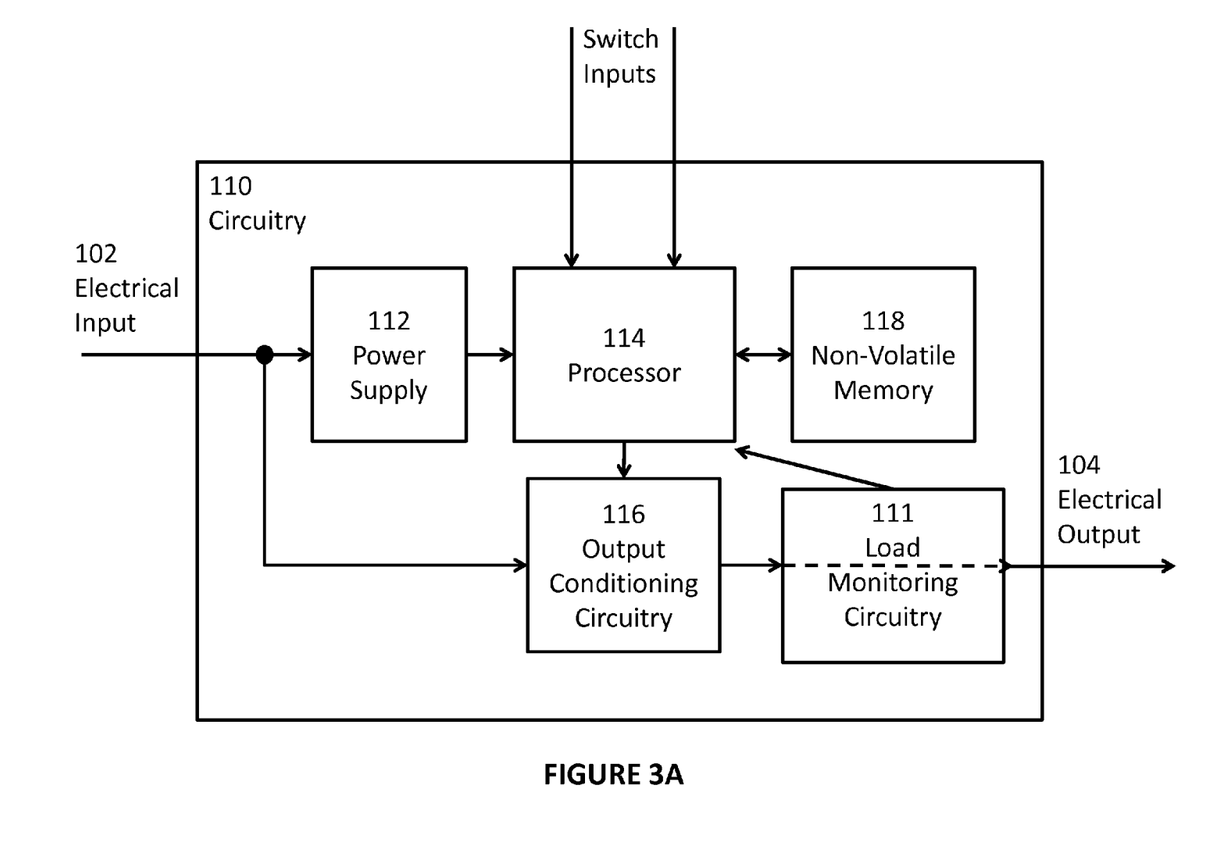
FIG. 3A illustrates circuitry for a flickering illumination control device, according to techniques of the present application.
Figure 3B:
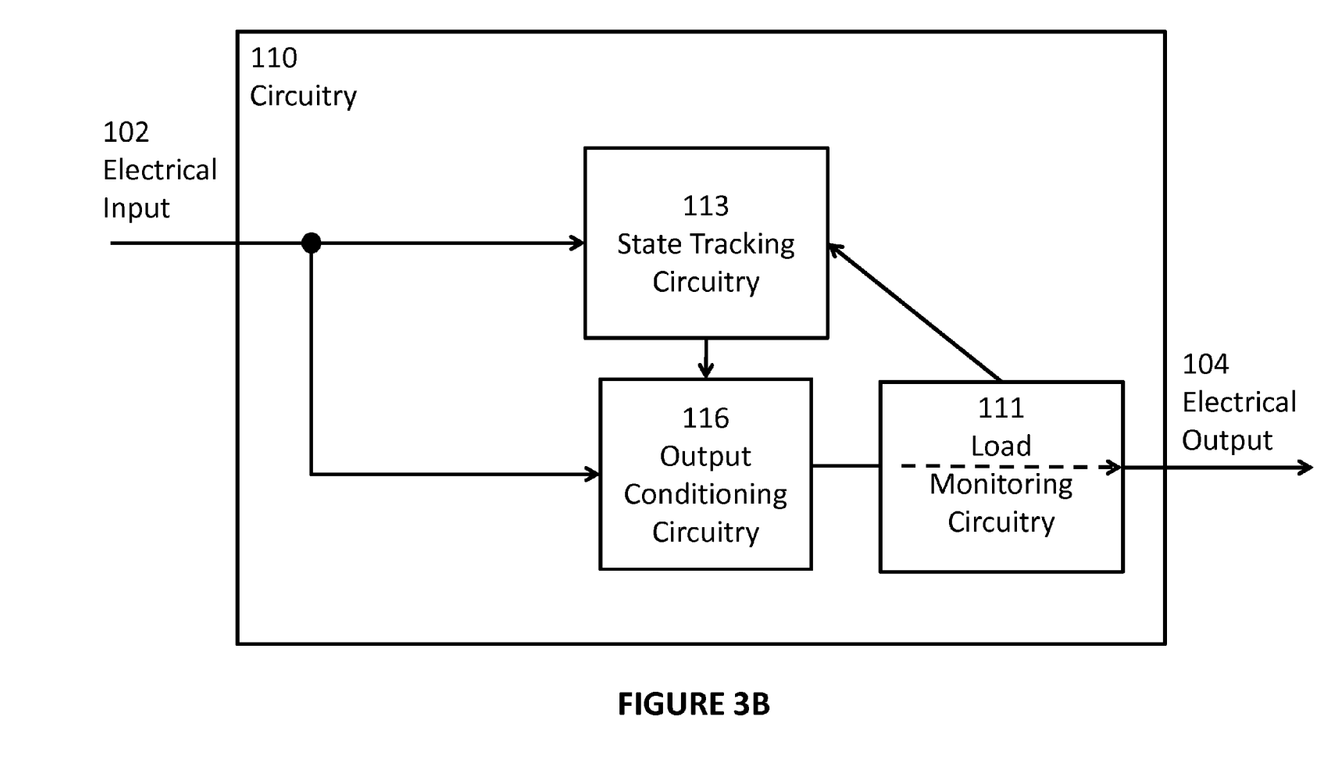
FIG. 3B illustrates circuitry for a flickering illumination control device, according to techniques of the present application.

The device 100 may also include circuitry, such as circuitry 110 illustrated in FIG. 3A or 3B. As shown in FIG. 3A, circuitry 110 may include a power supply 112, a processor 114, output conditioning circuitry 116, and memory 118. Some of the circuitry 110 may or may not be packaged together in one or more integrated circuits. The power supply 112 may receive voltage (for example 115 VAC) from the electrical input 102 and may responsively provide a low voltage to power to the processor 114 and other low-voltage circuitry in the device 100 (such as the memory 118 or portions of the output conditioning circuitry 116). The processor 114 may communicate with the memory 118 (for example, battery-backed memory or non-volatile memory). The processor 114 may provide control signals to (or receive feedback from) the output conditioning circuitry 116. Thus, the output conditioning circuitry 116 may operate under the control of the processor 114.

The processor 114 may detect the status of one or more switch inputs (such as switches 106 or 108). The processor 114 may also implement other functions, such as the timing functions described below. The processor 114 may read from or write to the memory 118. The processor 114 may control the output conditioning circuitry 116 to provide flickering or non-flickering voltages to the electrical output 104, for example, in response to the states of switches 106 or 108 and/or in response to changes in load current. Such control may reflect a value stored in the memory 118. Load monitoring circuitry 111 may monitor current flowing through the electrical output 104 and may communicate current flow information to the processor 114.

As shown in FIG. 3B, circuitry 110 may include state tracking circuitry 113, output conditioning circuitry 116, and load monitoring circuitry 111. Load monitoring circuitry 111 may monitor current flowing through the electrical output 104 and may communicate current flow information to the state tracking circuitry 113. The state tracking circuitry 113 may track different states according to intermittent cycles of current flowing through the electrical output 104. The state tracking circuitry 113 may responsively control the output conditioning circuitry 116 to provide flickering or non-flickering voltages to the electrical output 104 according to the nature of the intermittent cycles of current flowing through the electrical output 104.

Figure 4:
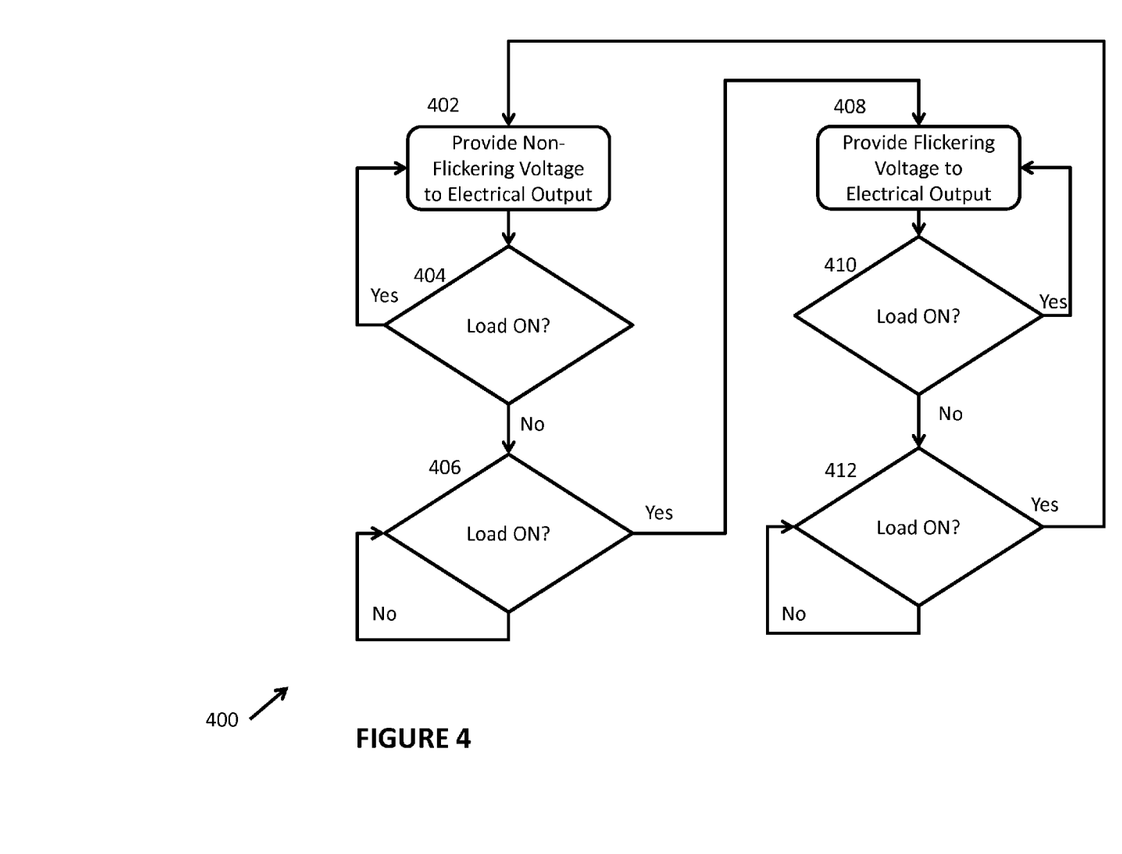
FIG. 4 shows a flowchart for a method of providing flickering or non-flickering voltages, according to techniques of the present application.

FIG. 4 shows a flowchart 400 for a method of providing flickering or non-flickering voltages, according to techniques of the present application. The steps shown in the flowchart 400 may be performable in conjunction with devices, such as device 100. Furthermore, the steps may be performable in a different order, may be omitted, or may be performed at least partially in parallel with each other. For exemplary purposes only, the flowchart 400 is described below as being implemented by device 100.

At step 402, a non-flickering voltage is provided to the electrical output 104 by the output conditioning circuitry 116. The non-flickering voltage may be a sinusoidal alternating voltage intended to create a substantially constant alternating current. At step 404, the state of the load (as determined by measuring whether current is flowing through the electrical output 104) may be checked by the load monitoring circuitry 111 to see if the load is turned ON (for example, the light source 30 is turned ON). If the load is ON, then the method proceeds back to step 402, and the output conditioning circuitry 116 continues to provide a non-flickering voltage to the electrical output 104. If the load is OFF, then the method proceeds to step 406.

At step 406, the state of the load (as determined by measuring whether current is flowing through the electrical output 104) may be checked by the load monitoring circuitry 111 to see if the load is turned ON (for example, the light source 30 is turned ON). If the load remains OFF, then the load monitoring circuitry 111 continues to monitor to see if the load is turned ON. If the load is turned ON, then the method proceeds to step 408.

At step 408, a flickering voltage is provided to the electrical output 104 by the output conditioning circuitry 116. The flickering voltage may be a sinusoidal alternating voltage intended to create a varying alternating current in the load in order to create a flickering effect. At step 410, the state of the load (as determined by measuring whether current is flowing through the electrical output 104) may be checked by the load monitoring circuitry 111 to see if the load is turned ON (for example, the light source 30 is turned ON). If the load is ON, then the method proceeds back to step 408, and the output conditioning circuitry 116 continues to provide a flickering voltage to the electrical output 104. If the load is OFF, then the method proceeds to step 412.

At step 412, the state of the load (as determined by measuring whether current is flowing through the electrical output 104) may be checked by the load monitoring circuitry 111 to see if the load is turned ON (for example, the light source 30 is turned ON). If the load remains OFF, then the load monitoring circuitry 111 continues to monitor to see if the load is turned ON. If the load is turned ON, then the method proceeds back to step 408.

Thus, the flowchart 400 illustrates a method that alternately provides non-flickering and flickering voltages to the electrical output 104 in response to changes in state of the load. According to flowchart 400, if the light source 30 is not flickering (is constant) then a user may turn the light source 30 OFF and then ON again to cause the light source 30 to flicker. Similarly, if the light source 30 is flickering then a user may turn the light source 30 OFF and then ON again to cause the light source 30 to stop flickering.

Figure 5:
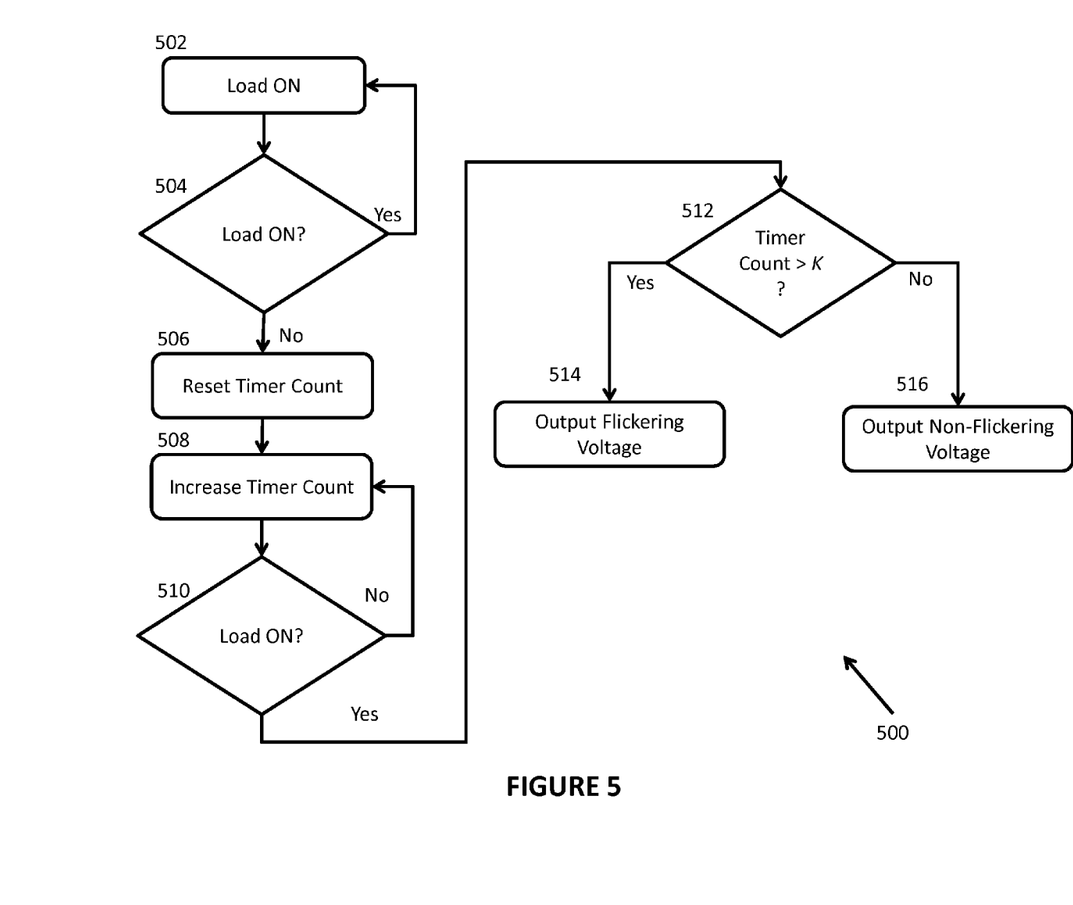
FIG. 5 shows a flowchart for a method of providing flickering or non-flickering voltages, according to techniques of the present application.

FIG. 5 shows a flowchart 500 for a method of providing flickering or non-flickering voltages, according to techniques of the present application. The steps shown in the flowchart 500 may be performable in conjunction with devices, such as device 100. Furthermore, the steps may be performable in a different order, may be omitted, or may be performed at least partially in parallel with each other. For exemplary purposes only, the flowchart 500 is described below as being implemented by device 100.

At step 502, the load is determined to be ON as measured by the load monitoring circuitry 111. At step 504, if the load turns OFF, then the flowchart 500 proceeds to step 506 and a timer count is reset. At step 508, the timer count is increased and it continues to increase as long as the load is determined to be OFF at step 510 (as measured by the load monitoring circuitry 111). Once the load turns back ON, the flowchart proceeds to step 512 where the timer count is compared to a reference value K. The reference value K may represent, for example, a number of seconds such as 10 seconds. If the timer count exceeds the reference value K, then the flowchart 500 proceeds to step 514 where a flickering voltage is provided by the output conditioning circuitry 116 to the electrical output 104. If the timer count does not exceed the reference value K, then the flowchart 500 proceeds to step 516 where a non-flickering voltage is provided to the electrical output 104 by the output conditioning circuitry 116.

Thus, the flowchart 500 illustrates a method that alternatively provides non-flickering and flickering voltages to the electrical output 104 in response to a duration for which the load is turned OFF. For example, if a user turns the light source 30 OFF for more than 10 seconds, then, when the user turns the light source 30 back ON, the light source 30 may flicker. As another example, if the user turns the light source 30 OFF for less than 10 seconds, then, when the user turns the light source back ON, the light source 30 may not flicker.

It may also be possible to reverse steps 514 and 516 so that a non-flickering voltage is provided by the output conditioning circuitry 116 to the electrical output 104 if the timer count is greater than the reference value K, and a flickering voltage is provided by the output conditioning circuitry 116 to the electrical output 104 if the timer count is less than the reference value K.

Figure 6:
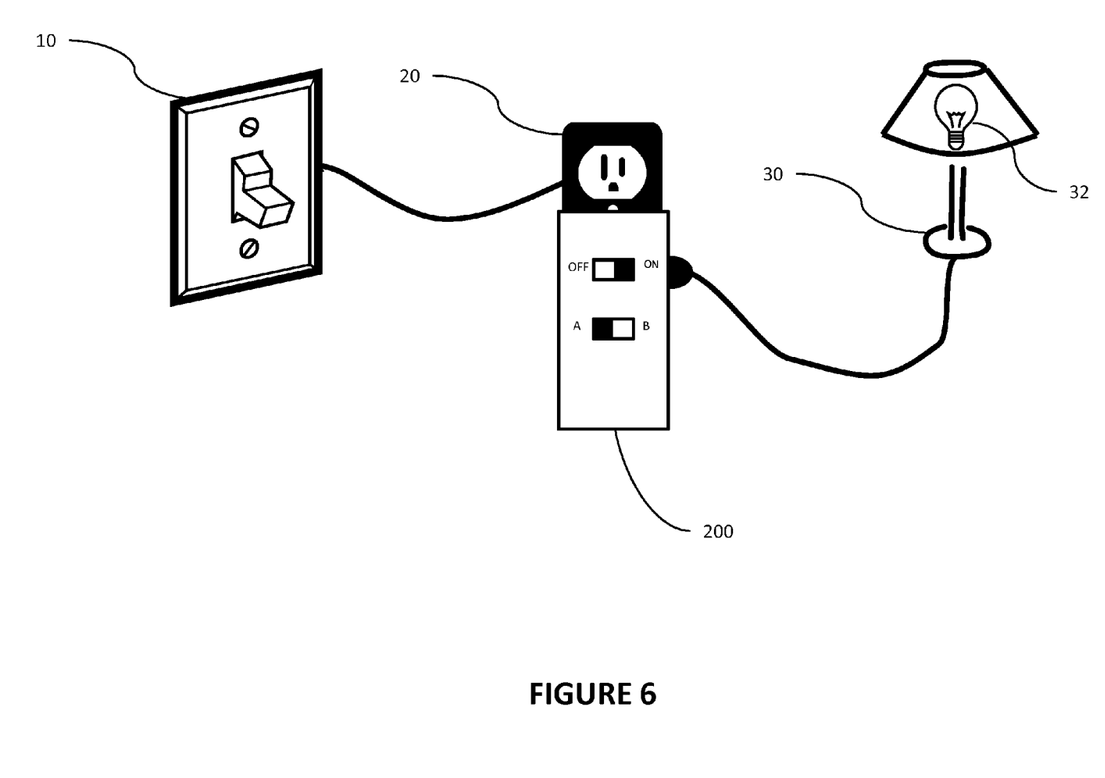
FIG. 6 illustrates a system including a flickering illumination control device, according to techniques of the present application.

FIG. 6 illustrates a system including a flickering illumination control device 200, according to techniques of the present application. The device 200 may be plugged into an outlet 20. The outlet 20 may be electrically connected with a switch 10 (for example, a toggle switch). The switch 10 may toggle a voltage (for example 115 VAC) provided to the outlet 20. A light fixture 30 may be plugged into the device 200. The light fixture may include a light source 32. The device 200 may have an appearance similar to that of device 100 (for example, as shown in FIG. 2).

Figure 7:
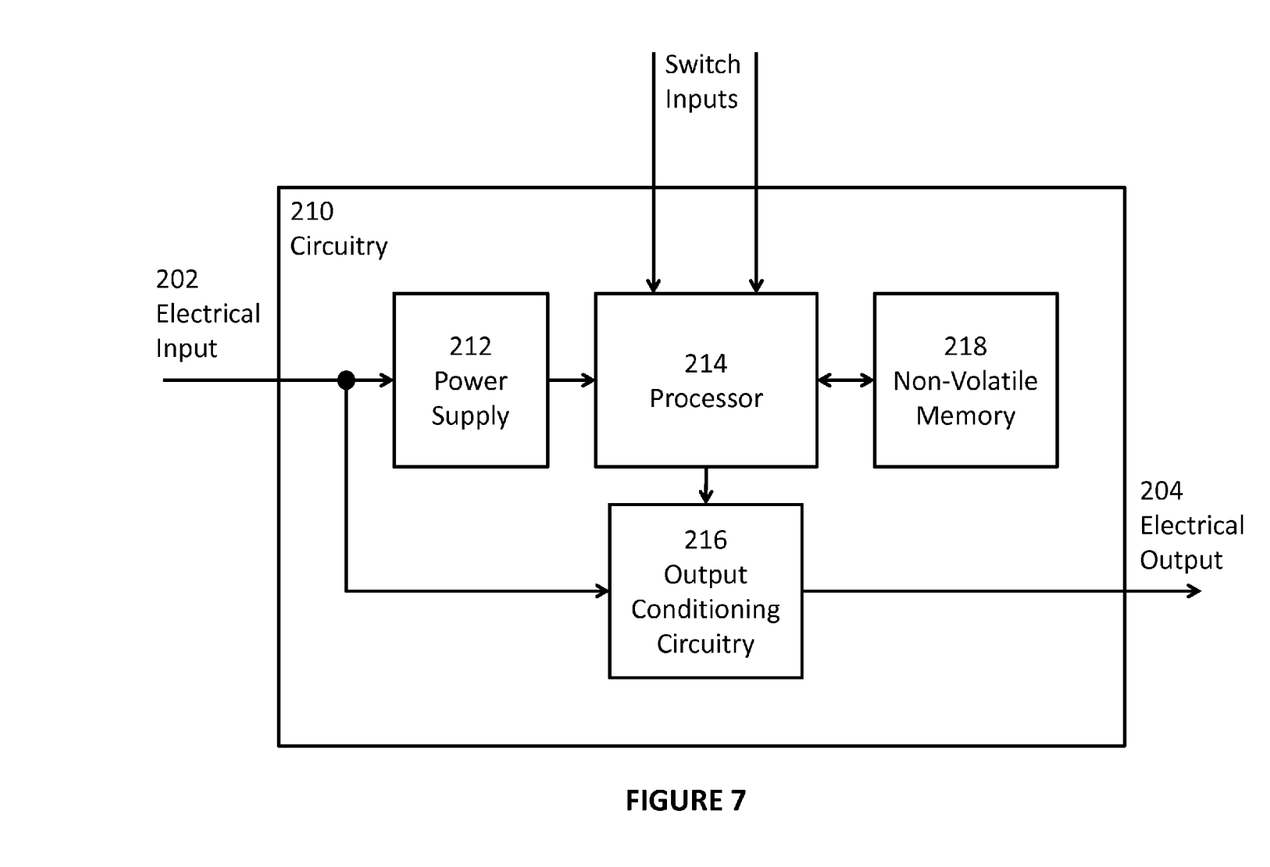
FIG. 7 illustrates circuitry for a flickering illumination control device, according to techniques of the present application.

The device 200 may also include circuitry, such as circuitry 210 illustrated in FIG. 7. Circuitry 210 may include a power supply 212, a processor 214, output conditioning circuitry 216, and memory 218. Some of the circuitry 210 may or may not be packaged together in one or more integrated circuits. The power supply 212 may receive voltage (for example 115 VAC) from the electrical input 202 and may responsively provide a low voltage to power to the processor 214 and other low-voltage circuitry in the device 200 (such as the memory 218 or portions of the output conditioning circuitry 216). The processor 214 may communicate with the memory 218 (for example, battery-backed memory or non-volatile memory). The processor 214 may provide control signals to (or receive feedback from) the output conditioning circuitry 216. The processor 214 may detect the status of one or more switch inputs (such as switches 206 or 208). The processor 214 may also implement other functions, such as timing functions. The processor 214 may read from or write to the memory 218. The processor 214 may control the output conditioning circuitry 216 to provide flickering or non-flickering voltages to the electrical output 204. Such control may reflect a value stored in the memory 218.

Figure 8:
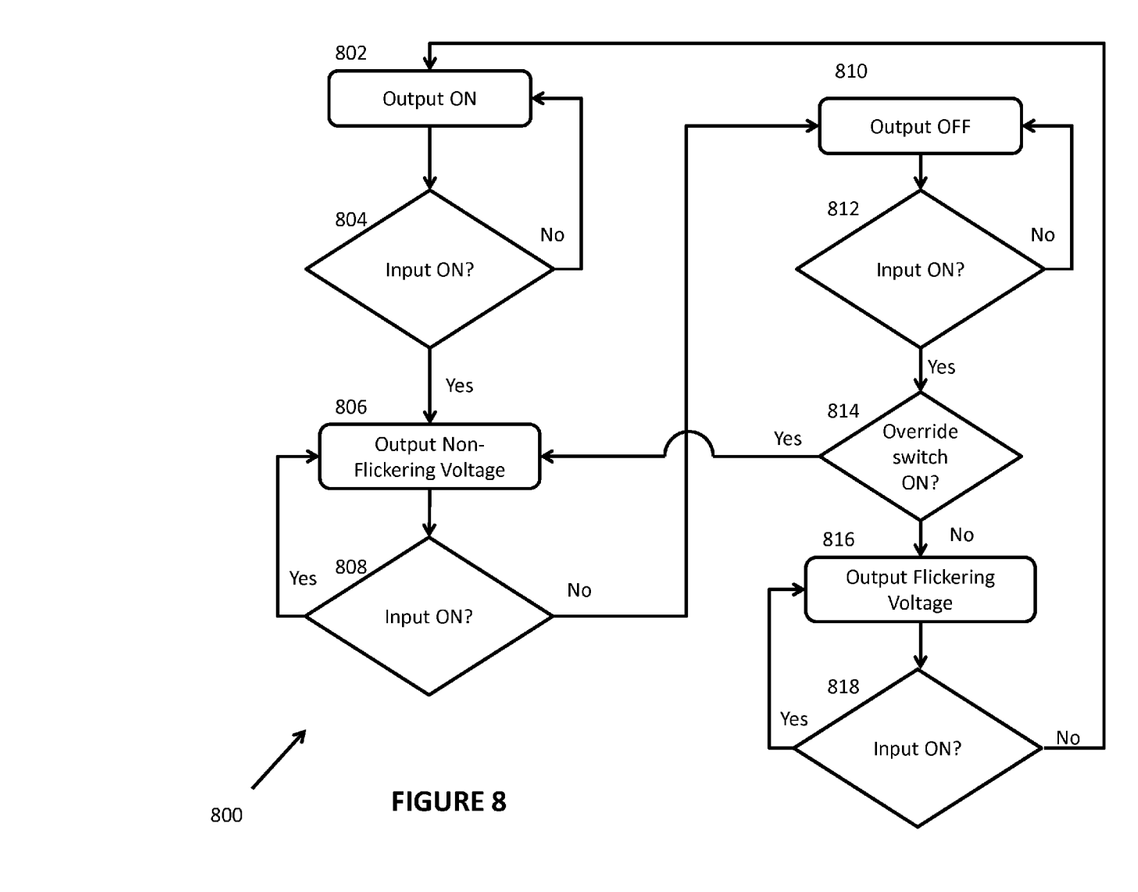
FIG. 8 shows a flowchart for a method of providing flickering or non-flickering voltages, according to techniques of the present application.

FIG. 8 shows a flowchart 800 for a method of providing flickering or non-flickering voltages, according to techniques of the present application. The steps shown in the flowchart 800 may be performable in conjunction with devices, such as device 200. Furthermore, the steps may be performable in a different order, may be omitted, or may be performed at least partially in parallel with each other. For exemplary purposes only, the flowchart 800 is described below as being implemented by device 200.

At step 802, the output 204 of the device 200 is off, for example, by virtue of no power voltage being provided to the output 204. The output 204 may be off if the device 200 is off (for example, if the device 200 is not receiving power through the input 202). The output 204 may also be off even if the device 200 is on. For example, back-up power (for example, batteries or capacitors) may be available to operate at least portions of the device 200 for a duration of time after power is no longer received through the input 202. Under such a scenario, the processor 214 could continue to operate and, for example, maintain functionality such as a timer or time keeping.

At step 804, if the input 202 is not receiving power, then the output 204 of the device 200 continues to be off. If the input 202 does receive power then, at step 806, the device 200 outputs a non-flickering voltage from the output 204.

At step 808, if the input 202 continues to receive power, then the non-flickering voltage continues to be provided by the output 204. If the input 202 does not receive power (for example, power is interrupted), then the output 204 is off at step 810 (which may be similar to step 802).

At step 810 (which may be similar to step 804), if the input 202 is not receiving power, then the output 204 of the device 200 continues to be off. At step 814, if the override switch is on, then the flowchart sequences back to step 806, and a non-flickering voltage is provided to the output. If the override switch is not on, then a flickering voltage is provided to the output at step 816. At step 818, if the input 202 continues to receive power, then a flickering voltage is still provided to the output 204. If the input 202 no longer receives power, then the flowchart 800 cycles back to step 802.

Thus, the flowchart 800 illustrates a method that alternately provides non-flickering and flickering voltages to the electrical output 204 in response to changes in state of the input. According to flowchart 800, if the light source 30 is not flickering (is constant) then a user may switch the switch 10 OFF and then ON again to cause the light source 30 to flicker. Similarly, if the light source 30 is flickering then a user may switch the switch 10 OFF and then ON again to cause the light source 30 to stop flickering.

Figure 9:
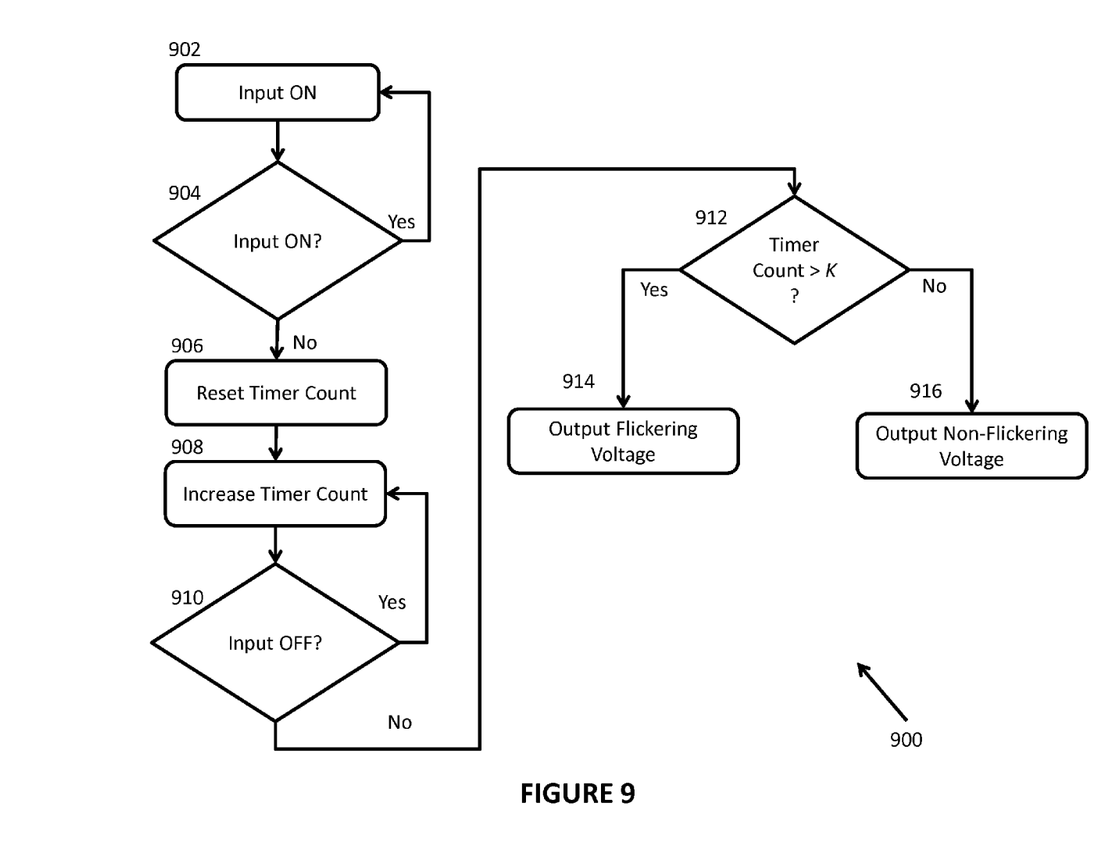
FIG. 9 shows a flowchart for a method of providing flickering or non-flickering voltages, according to techniques of the present application.

FIG. 9 shows a flowchart 900 for a method of providing flickering or non-flickering voltages, according to techniques of the present application. The steps shown in the flowchart 900 may be performable in conjunction with devices, such as device 200. Furthermore, the steps may be performable in a different order, may be omitted, or may be performed at least partially in parallel with each other. For exemplary purposes only, the flowchart 90 is described below as being implemented by device 200.

At step 902, the electrical input 202 is receiving power. At step 904, if the input power turns OFF, then the flowchart 900 proceeds to step 906 and a timer count is reset. At step 908, the timer count is increased and it continues to increase as long as the input power is determined to be OFF at step 910. The timer may be powered by a back-up battery, capacitor, or some other power source apart from the power provided through the electrical input 102. Once the input power turns back ON, the flowchart proceeds to step 912 where the timer count is compared to a reference value K. The reference value K may represent, for example, a number of seconds such as 10 seconds. If the timer count exceeds the reference value K, then the flowchart 900 proceeds to step 914 where a flickering voltage is provided by the output conditioning circuitry 216 to the electrical output 204. If the timer count does not exceed the reference value K, then the flowchart 900 proceeds to step 916 where a non-flickering voltage is provided to the electrical output 204 by the output conditioning circuitry 216.

Thus, the flowchart 900 illustrates a method that alternatively provides non-flickering and flickering voltages to the electrical output 204 in response to a duration for which the input to the device 200 is turned OFF. For example, if a user turns the light switch 10 OFF for more than 10 seconds, then, when the user turns the light switch 10 back ON, the light source 30 may flicker. As another example, if the user turns the light switch 10 OFF for less than 10 seconds, then, when the user turns the light switch 10 back ON, the light source 30 may not flicker.

It may also be possible to reverse steps 914 and 916 so that a non-flickering voltage is provided by the output conditioning circuitry 216 to the electrical output 204 if the timer count is greater than the reference value K, and a flickering voltage is provided by the output conditioning circuitry 216 to the electrical output 204 if the timer count is less than the reference value K.

Figure 10A:
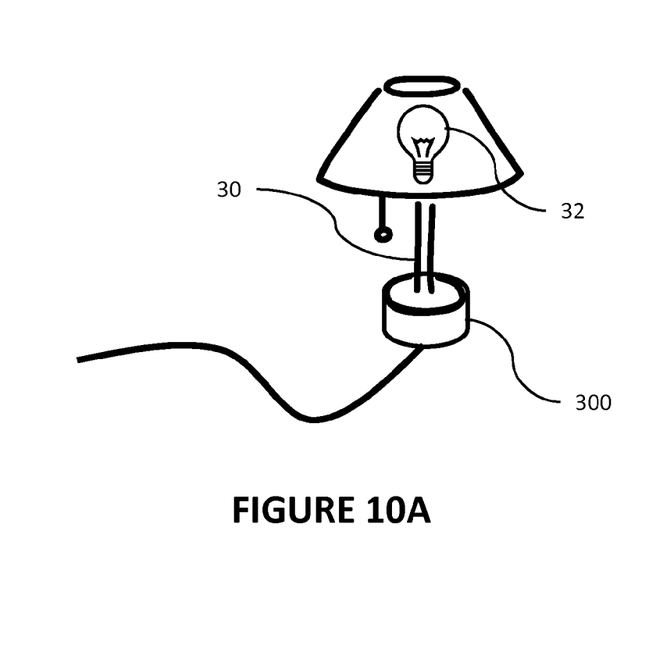
FIG. 10A illustrates a system including a flickering illumination control device, according to techniques of the present application.

FIG. 10A illustrates a system including a flickering illumination control device, according to techniques of the present application. A device 300 may be integrated into, or may be attached to a lamp 30. The device 300 may employ techniques similar to those discussed above with reference to devices 100, 200.

Figure 10B:
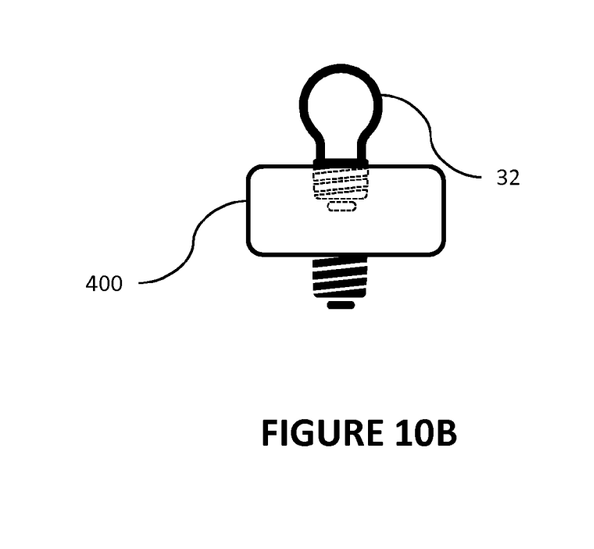
FIG. 10B illustrates a system including a flickering illumination control device, according to techniques of the present application.

FIG. 10B illustrates a system including a flickering illumination control device, according to techniques of the present application. A device 400. The device 400 may mount in a light socket. The device 400 may also have a socket, in which a light source 32 can be mounted. The device 400 may employ techniques similar to those discussed above with reference to devices 100, 200.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. For example, while 120 VAC techniques have been primarily disclosed, similar techniques could be applied to other voltages, such as low-voltage DC. Therefore, it is intended that the novel techniques not be limited to the particular techniques disclosed, but that they will include all techniques falling within the scope of the appended claims.

The invention claimed is:

1. A method for operating a flickering illumination control device including an electrical input and an electrical output, wherein the method comprises:
   receiving an input voltage at the electrical input;
   providing a non-flickering output voltage at the electrical output;
   while receiving the input voltage and while providing the non-flickering output voltage, detecting a first interruption in current flowing through the electrical output; and
   in response to the first interruption, providing flickering output voltage at the electrical output.

2. The method of claim 1, further comprising:
   while receiving the input voltage and while providing the flickering output voltage, detecting a second interruption in current flowing through the electrical output; and
   in response to the second interruption, providing the non-flickering output voltage at the electrical output.

3. The method of claim 1, wherein the non-flickering output voltage is the same as the input voltage.

4. The method of claim 1, further comprising:
   detecting whether an override switch on the flickering illumination control device is in an override state; and
   if the override switch is in the override state, providing the non-flickering output voltage instead of the flickering output voltage at the electrical output.

5. A method for operating a flickering illumination control device including an electrical input and an electrical output, wherein the method comprises:
receiving an input voltage at the electrical input;
while receiving the input voltage, detecting an interruption in current flowing through the electrical output;
measuring a length of a duration of the interruption; and
according to the length of the duration of the interruption, alternatively providing either a flickering output voltage or a non-flickering output voltage to the electrical output.

6. The method of claim 5, further comprising:
determining whether the length of the duration of the interruption is greater than a reference length of time or lesser than the reference length of time;
if the length of the duration of the interruption is greater than the reference length of time, providing the non-flickering output voltage to the electrical output; and
if the length of the duration of the interruption is lesser than the reference length of time, providing the flickering output voltage to the electrical output.

7. The method of claim 5, wherein the non-flickering output voltage is the same as the input voltage.

8. The method of claim 5, further comprising:
detecting whether an override switch on the flickering illumination control device is in an override state; and
if the override switch is in the override state, providing the non-flickering output voltage instead of the flickering output voltage at the electrical output.

9. A method for operating a flickering illumination control device including an electrical input and an electrical output, wherein the method comprises:
receiving, at a first time, an input voltage at an electrical input and responsively providing a non-flickering voltage to the electrical output;
receiving, at a time between subsequent to the first time, a first interruption of the input voltage at the electrical input; and
receiving, at a second time subsequent to the first interruption, the input voltage at the electrical input and responsively providing a flickering voltage to the electrical output.

10. The method of claim 9, further comprising:
receiving, at a time subsequent to the second time, a second interruption of the input voltage at the electrical input; and
receiving, at a third time subsequent to the second interruption, the input voltage at the electrical input and responsively providing a non-flickering voltage to the electrical output.

11. The method of claim 9, wherein the non-flickering output voltage is the same as the input voltage.

12. The method of claim 9, further comprising:
detecting whether an override switch on the flickering illumination control device is in an override state; and
if the override switch is in the override state, providing the non-flickering output voltage instead of the flickering output voltage at the electrical output.

13. A method for operating a flickering illumination control device including an electrical input and an electrical output, wherein the method comprises:
receiving an input voltage at the electrical input;
detecting an interruption in the input voltage;
measuring a length of a duration of the interruption; and
according to the length of the duration of the interruption, alternatively providing either a flickering output voltage or a non-flickering output voltage to the electrical output.

14. The method of claim 13, further comprising:
determining whether the length of the duration of the interruption is greater than a reference length of time or lesser than the reference length of time;
if the length of the duration of the interruption is greater than the reference length of time, providing the non-flickering output voltage to the electrical output; and
if the length of the duration of the interruption is lesser than the reference length of time, providing the flickering output voltage to the electrical output.

15. The method of claim 13, wherein the non-flickering output voltage is the same as the input voltage.

16. The method of claim 13, further comprising:
detecting whether an override switch on the flickering illumination control device is in an override state; and
if the override switch is in the override state, providing the non-flickering output voltage instead of the flickering output voltage at the electrical output.

17. A device comprising:
an electrical input configured to receive an input voltage;
an electrical output;
output conditioning circuitry electrically connected to the electrical input and the electrical output; and
wherein the output conditioning circuitry is configured to:
receive the input voltage from the electrical input, and
while receiving the input voltage, alternately provide a flickering alternating current output voltage or a non-flickering alternating current output voltage to the electrical output in response to interruptions in the current flowing through the electrical output.

* * * * *